J. WLODZIMIRSKI.
METHOD OF REGISTERING THE COURSE AND SPEED OF SHIPS.
APPLICATION FILED FEB. 27, 1909.
1,073,832.
Patented Sept. 23, 1913.
3 SHEETS—SHEET 1.
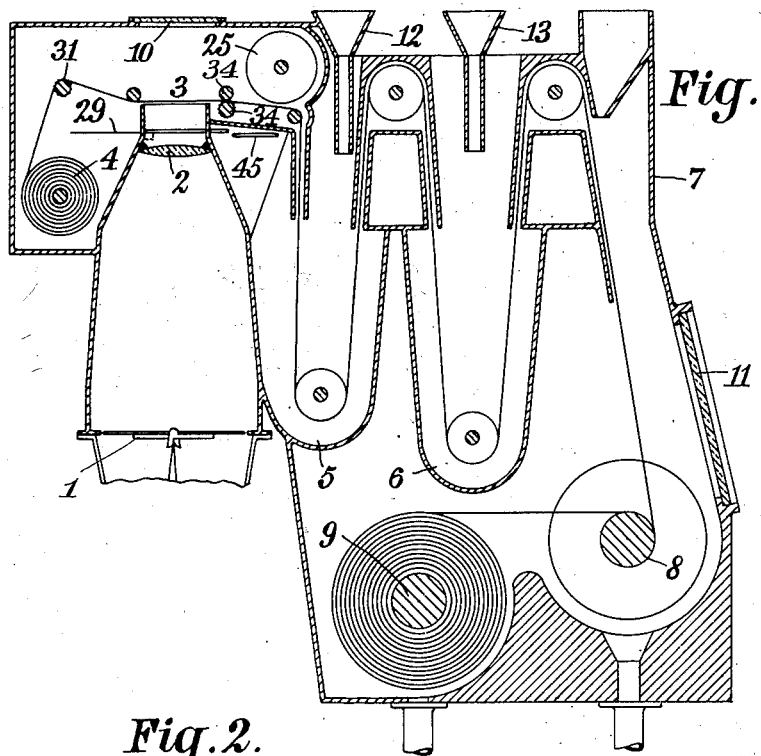
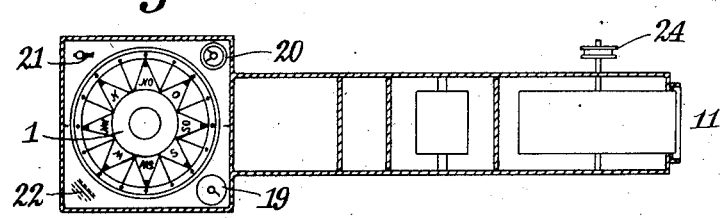
Witnesses:
John Murtagh
L. J. Murphy
Inventor:
Julius Wlodzimirski
by Goepel & Goepel Attorneys J. WLODZIMIRSKI.
METHOD OF REGISTERING THE COURSE AND SPEED OF SHIPS.
APPLICATION FILED FEB. 27, 1909.
1,073,832.
Patented Sept. 23, 1913.
3 SHEETS—SHEET 2.
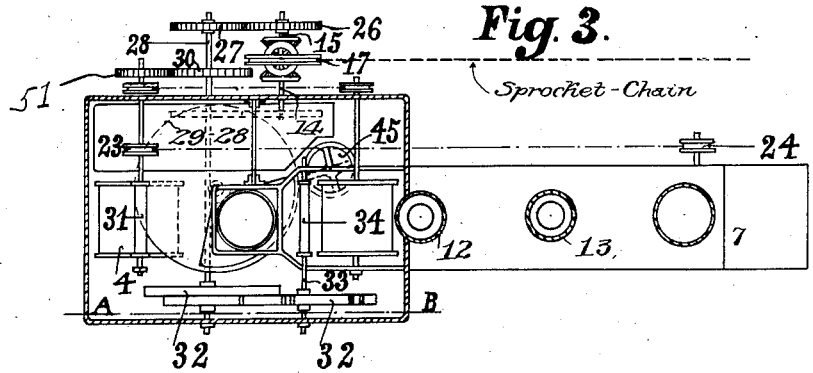
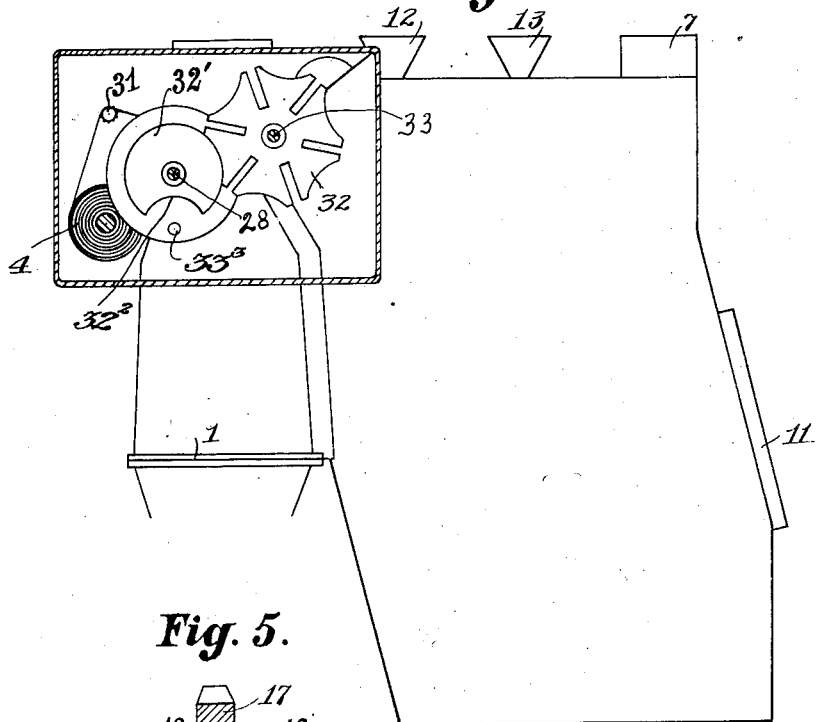
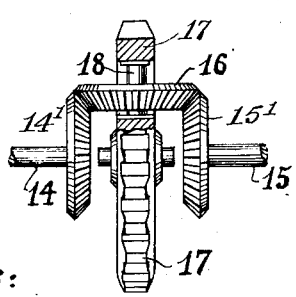
Witnesses:
John Murtagh
L. J. Murphy
Inventor:
Julius Wlodzimirski
by Goepel
Attorneys J. WLODZIMIRSKI.
METHOD OF REGISTERING THE COURSE AND SPEED OF SHIPS.
APPLICATION FILED FEB. 27, 1909.
1,073,832.
Patented Sept. 23, 1913.
3 SHEETS—SHEET 3.
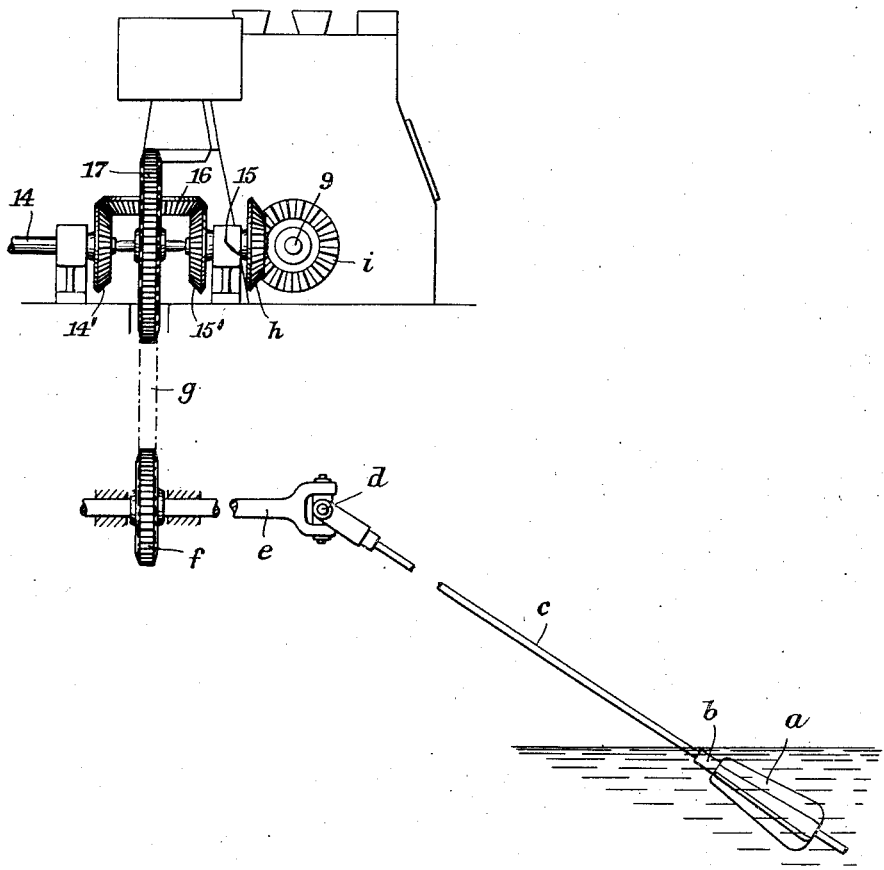

UNITED STATES PATENT OFFICE.

JULIAN WLODZIMIRSKI, OF KIELCE, RUSSIA.

METHOD OF REGISTERING THE COURSE AND SPEED OF SHIPS.

1,073,832. Specification of Letters Patent. Patented Sept. 23, 1913.

Application filed February 27, 1909. Serial No. 480,366.

*To all whom it may concern:*

Be it known that I, JULIAN WLODZIMIRSKI, a subject of the Czar of Russia, and residing at Kielce, Russia, have invented a certain new and useful Improved Method of Registering the Course and Speed of Ships, of which the following is a specification.

The present invention relates to the registration of the course and speed of ships.

It has frequently been attempted to register the course of ships automatically by having the registering devices influenced by the movements of the compass-card. Such devices are so complicated, however, and are simultaneously also so inexact that no value can be attached to records obtained in this manner.

The subject-matter of the present invention is a new method of registering the course of ships and simultaneously the speed of the same, and it substantially consists in photographing a compass at definite intervals, whereupon the angular position of the ship or its longitudinal axis relatively to the magnetic north can then be read at any time and the course of the ship determined from the photographic views. For this purpose a sensitive band or strip, for example a film, is moved continuously at a uniform speed, or periodically a certain distance each time, past an objective which is uncovered periodically and thus throws a picture of the compass located under this objective onto the sensitive film; the latter can then be developed and fixed in the usual manner, so that on the film a consecutive series of pictures of the compass is obtained. In each of these views the angular position of the ship relatively to the magnetic north is given exactly, so that by comparing the pictures the course of the ship during a definite period is obtained. If at the same time a clock or watch is arranged in the field of the objective, either in the middle of the compass-card or laterally of this, and if in addition the name of the ship, the month and year are stated on or close to the compass, the course of a ship at any time can be determined exactly photographically for intermittent periods of time during the voyage. Such a film is preferably of such length and passed through the photographic apparatus in such manner that it registers for a definite number of hours, say twelve, and is then replaced by a new one. With the same film which indicates the course of the ship, however, the distance covered or the speed of the ship at a definite time can also be registered.

The strip or film is preferably moved by a suitable driving device at such a speed that when records are taken periodically one picture joins directly onto the next. The driving device of the film may, however, be influenced simultaneously by a suitable speed-recorder, say by a ship's log, so that in addition to the speed of the film imparted to it by the ordinary driving device, the film is driven at a speed which corresponds to the speed of the ship. Under the influence of this additional driving means the speed of the strip or film will be more or less increased as compared with its normal speed, so that the pictures no longer join one another, but there will be between the separate views certain spaces corresponding to the speed of the ship in each instance. If the sensitive strip is graduated, for example, the speed of the ship for the given point of time readable from the picture of the compass can be determined simply by reading the degrees, *i. e.* the space between the pictures.

In order that the invention may be clearly understood reference will be made to the accompanying drawing in which one form of apparatus for carrying the same into practice is represented by way of example, and in which:

Figure 1 is a vertical section of the apparatus for determining the course and speed of a ship; Fig. 2 is a bottom view of the device of Fig. 1; Fig. 3 is a plan view of the same; Fig. 4 is a side elevation partly in vertical section on line A—B, Fig. 3; Fig. 5 is a side elevation of the differential gear for determining the speed of the vessel and the course of the same; Fig. 6 is a detail view of the actuating device for the shutter of the objective; Fig. 7 is a section of the same on the line C—D, Fig. 6; and Fig. 8 is a side elevation, showing the connection of the ship's log with the differential gear shown in Fig. 5.

Similar reference characters indicate corresponding parts throughout the several figures.

In Fig. 2, 1 designates the face or disk of an ordinary compass with means 19 for indicating the speed, a clock 20, means 21 for indicating forward and reverse motion, and space 22 for other details. Above the compass-disk is arranged an objective 2, shown in Fig. 1, of any suitable size and form. Adjacent to the objective 2 is arranged a sensitized film 3, which is located in a light tight case, so that no light is admitted. The film 3 is unwound from the roll or spool 4. The film is moved either continuously at a definite, constant speed or intermittently for a certain distance in such a manner that, in any case, when the film is exposed intermittently, the film is subjected to the light and that with normal movements, one picture joins the other. The speed of the film, or the distance which the same is moved each time, depends substantially on the duration of the intervals between the individual exposures, it being noted that such exposures can be made, for instance, for every minute or every five minutes or at longer intervals. The motor for moving the film band is not shown in the drawing, but it is understood that the same may be moved by a clock-work electrically, or otherwise, without limiting the scope of this invention. In Fig. 3, 23, denotes the place in which the motor is located.

By the same driving device, a disk or shutter for the objective 2, shown in Fig. 1, is intermittently actuated, so that at certain definite intervals of time, the band 3 is exposed to the light. The objective 2 is, of course, proportioned in such a manner that only one view of the compass and of the parts connected with it, which are to be photographed, is taken. As already mentioned, close above or beside the compass a clock or watch may be arranged, and also the name of the ship, day, month and year of each exposure can be recorded, so that each view taken of the compass can indicate the course of the ship as well as the time of the exposure, date &c. Also details in regard to the effect of the wind, forward and backward motion, etc. In the form of apparatus shown in the drawing, the sensitized film is conveyed directly after its exposure into an automatic developing apparatus, such as is known in similar developing devices.

5 designates the trough or bath in which the picture is developed, whereupon the film passes into the trough or bath 6 where it is fixed, in order to be washed with water from a funnel 7 for removing the fixing agent. The film then passes over a roller 8 onto the winding-up roller 9 where it is wound up and preserved, possibly with the aid of india-rubber edges for preventing the separate parts sticking together. The driving means for the film can either engage the roller 9, by a sprocket wheel and chain transmission, shown in Fig. 3, in which event the film is drawn through the different baths, or the separate rollers in the baths may be connected with the driving means by toothed-wheel gearing in order to assure the film being moved uniformly. The movement of the sensitive strip 3 can be observed through a pane of glass 10 in the upper part of the apparatus, whereas the development of the film can be observed through a laterally arranged glass 11. The chemicals necessary for developing and fixing the film are introduced through funnels 12 and 13. It is to be understood that the developing apparatus may be modified in numerous ways. Also it is possible to wind up the film after it has been exposed but not developed, and to develop it independently after its removal from the apparatus, as is customary in the case of films and like sensitive bodies.

As mentioned above, with the aid of the described apparatus not only can the course of the ship be registered automatically and continuously, but also a continuous and exact record of the speed of the ship can be obtained by an additional movement corresponding to the speed of the ship at each instant being imparted to the movable band or film 3. This can be done in a simple manner by connecting the driving device necessary for driving the film by means of an ordinary differential gear with a device, for example the log of the ship, measuring the speed of the ship.

Fig. 5 shows such a differential gear. In this figure, 14 is the shaft which is rotated by the driving device for the sensitive film 3, and 15 is the shaft which drives the film itself. The two bevel-wheels $14^1$ and $15^1$ on these shafts mesh with a third bevel-wheel 16 which is revoluble on an axle 18 inserted radially in a sprocket wheel 17. This sprocket wheel is rotated more or less rapidly by a sprocket-wheel and chain transmission with the speed recorder, for example by a ship's log, dependent on the speed of the ship.

The ship's log $a$ consists of a floating body $b$ which is arranged on an inclined shaft $c$ that holds the log submerged in the water at the stern of the vessel, the speed of the vessel turning the log $a$ and thereby the shaft $c$ quicker or slower according to the speed of the vessel. The rotation of the shaft $c$ is transmitted by means of a universal joint $d$ to an intermediate horizontal shaft $e$ which is supported in bearings (not shown) in the hull of the vessel. On the shaft $e$ a sprocket-wheel $f$ is located which transmits by a sprocket-chain $g$ rotary motion to the sprocket-wheel 17 of the differential gear. When therefore, as before described, the shaft 14 with its bevel gear-wheel $14^1$ is driven at uniform speed by a clock-movement, the bevel gear-wheel $14^1$, meshing with the bevel gear-wheel 16, transmits motion to the bevel gear-wheel $15^1$, then the bevel gear-wheel 16, which is located on a radial shaft 18 (Fig. 5), will impart by the rotation of the sprocket-wheel 17, due to the rotary motion of the log $a$, a differentiated movement from the bevel gear-wheel $14^1$ to the bevel gear-wheel $15^1$, so that the uniform speed imparted by the clock-movement to the shaft 14 is augmented by the rotatory speed of the log, but this augmentation of the speed is variable and dependent on the speed of the vessel. When therefore the shaft 15 drives a bevel gear-wheel transmission $h$ and $i$, which transmits motion to the shaft 9, on which the sensitive film is wound up, the latter receives a speed which is dependent on the speed of the clock-movement acting on the shaft 14, and in addition thereto, on the speed of the vessel respectively as transmitted by the log $a$. When therefore the opening for the objective by which the sensitive film is subjected to the action of the light, takes place at definite and uniform intervals of time, then there will be formed, as the speed of the film is variable in connection with the varying speed of the vessel, greater or smaller interstices between the individual pictures of the compass, which interstices correspond exactly to the deviations in the speed of the vessel.

When the sprocket-wheel 17 is not operated as when the ship is at a standstill for some reason or other, the shaft 15 is driven directly by the shaft 14 by means of the wheel 16, namely at such a speed that the sensitive film 3 is exposed without any space being left between the pictures. But when the sprocket wheel is rotated by the speed recorder of the ship, in addition to the motion imparted to the shaft 15 by the shaft 14, under the influence of the rotation of the sprocket wheel a motion is imparted which increases the speed of the traveling film 3 more or less as compared with its normal movement, this increased movement depending on the speed of the ship at each instant. The consequence is that between the individual pictures of the sensitive strip 3 there are formed intervals which correspond to the speed of the ship at each instant. By reading these intervals therefore, the distance covered by, or the speed of the ship can be determined at once. The sensitive strip may, however, also have a scale on it, so that the speed of the ship can be found at once from the number of the divisions of the scale between the views. Hence the developed and sensitive strip 3 shows for each moment of the voyage of a ship on the one hand the course of the ship and on the other hand the speed of the same, and whether it is stationary, when one picture joins directly onto another. Care of course, must be taken, by a suitable selection of the objective 2, that the sharpness of the picture does not suffer when the compass-card moves owing to the oscillations of the ship.

The winding roll 9 in Fig. 1 is not directly operated by the differential gear, but the shaft 15 of the latter transmits its variable speed of rotation by gear-wheels 26, 27, 30 and 51 to the shaft of the roller 4 from which the different rolls 31, 34, etc., are driven by means of sprocket-wheels and sprocket-chains 23, 24, so that thereby the sensitive film which passes over the rolls 31, 34, etc. is driven at a variable speed depending on the varying speed of the vessel. The shaft 28, however, is rotated from the shaft 14 by means of an intermediate gear, and this shaft 28 drives by means of bevel gear-wheels $46^1$ and 47 the shutter 29, as shown in Fig. 7, so that a uniform intermittent rotary motion is imparted to the shutter 29. The shutter 29 is provided with a sector-shaped recess, which is covered by a sector-shaped plate 35. The sector-shaped plate 35 is located parallel with and closely above the shutter 29 and is rotatable independently therefrom, but forced by means of a spring, which is wound around the pivot of the shutter, at its edge against a stop 38, so that the sector-shaped opening in the shutter 29 is covered by the plate 35, that is to say, closed. The sector-shaped plate or cover 35 is placed by means of a radial slot 36 on the pivot of the shutter 29. The plate 35 has likewise an arc-shaped slot 36 eccentrically to the pivot, into which projects a pin 37, which is attached to the shutter 29. By a relative shifting of the sector-shaped plate 35 toward the shutter 29 and the action of the pin 37 in the slot 36 and the arrangement of the slot 36 around the pivot of the shutter, a radial shifting of the entire plate 35 in outward direction is produced simultaneously with the tensioning of the spring that acts on the plate. When the plate 35, after it has been placed into its end position, is released, it is returned by the influence of the spring instantly into its former position until its edge abuts the stop 38, so as to close thereby the sector-shaped opening of the shutter 29, while simultaneously the plate 35 is moved radially in inward direction, as it is again under the influence of the pin acting on the slot 36. To obtain this relative turning of the cover-plate 35 toward the shutter 29, the former is provided with an arm 39 arranged radially to the shutter 29, and adjacent to the shutter 29 is arranged a special wheel or disk 41 to which an intermittent rotary motion is imparted. This wheel 41 carries a radial arm 40 which projects over its circumference, and which is guided at one end by a radial slot on the pivot-pin 42 of the wheel 41 and on the other end by a bayonet-like slot on a pin 44 that is located near the circumference of the wheel 41. The bayonet-like slot contains a recess disposed in such a way that by the radial shifting of the arm 40 the pin 44 is moved into the recess, and that when in this position the arm 40 is turned around, the pin 44 is moved entirely out of the recess. In addition thereto, there is arranged on the wheel 41 a pin 43, between which and the arm 40 a spring is arranged, which is connected at its other end to the arm 40, and which has a tendency to pull the arm 40 away from the pin 44 and toward the pin 43. The intermittent motion of the wheel 41 is produced by the shifting device shown in Fig. 4. At the end of the shaft 28 is located a disk $32^1$, which has a segmental recess $31^2$ at one portion of its circumference, adjacent to a pin $33^3$ on the disk, said pin engaging a shift-wheel 32 on the shaft 33. The shift-wheel 32 has radial recesses and separate arc-shaped edges, the curvatures of which correspond to the disk $32^1$. When therefore the disk $32^1$ forms contact at its circumference with one of the arc-shaped recesses of the shift-wheel 32, then the disk $32^1$ can be turned without moving the shift-wheel 32 or the shaft 33. But when the pin on the disk $32^1$ enters into one of the radial recesses of the shift-wheel 32, then the latter is shifted or turned for a corresponding distance. With each rotation of the shaft 28, respectively of the disk $32^1$, the shift-wheel 32 is turned for a fractional part of its rotation. The shaft 33 is further connected by a suitable motion-transmitting gear (not shown) with the pivot-shaft 42 of the wheel 41, so that likewise the wheel 41 participates in the rotary motion imparted to the shift-wheel. After a certain number of rotations of the shaft 28, the shift-wheel 32 and the shaft 33, and thereby the wheel 41, are induced to make a complete rotation, which is governed by the number of radial slots arranged in the shift-wheel 32.

From the foregoing, the operation of the shutter is therefore as follows: The shutter 29 is turned as it is operated directly from the shaft 28 uniformly and continuously. The sector-shaped plate 35 with its arm 39 takes part in this rotation while still closing the sector-shaped opening of the shutter 29. The wheel 41 is moved intermittently until, after a certain number of rotations of the shutter 29, the wheel 41 arrives in the position shown in Fig. 6, in which the radially projecting end of the arm 40 abuts against the projecting end of the arm 39. The relative arrangement of the parts is such that at this moment the objective is located over the plate 35, respectively over the sector-shaped opening of the shutter 29. When therefore at this moment the plate 35 is opened, the light can act on the sensitive film. The opening is produced by the arms 39, 40, as by them the plate 35 is prevented for a certain time to take part in the continuous motion of the shutter 29 as the arm 40 holds back the plate 35. This action sets the spring, which acts on the plate 35, to tension. By the relative movement of the plate 35 toward the shutter 29, the plate, as before stated, is moved by the action of the pin 37 on the slot 36 in a radial outward direction. This movement of the plate 35 produces that the arm 39, which is moved likewise in radial outward direction, shifts the arm 40 of the wheel 41 radially inward, so that the pin 44 on the wheel 41 traveling in the bayonet-shaped recess, gets into the recess of the arm 40, in which position the spring 43 has suddenly the chance to pull the arm 40 and move it on its pivot 42, so that the arm 39 of the plate 35 is liberated and the latter quickly returned under the influence of the spring into the closing position, until the edge of the plate abuts against the stop 38, the plate closing thereby the sector-shaped opening of the shutter 29, whereby the influence of the light on the sensitive film is interrupted.

The next operation to be performed is that the arm 40, which is drawn by the spring 43 toward its stop, is returned to its former normal position. This is accomplished by means of the curved cams 48, 49, which are shown in Fig. 6. When, in the described position of the arm 40, the wheel 41 is operated by the shift-wheel 32 and set in motion, then the face of the cam 48 holds the arm 40 long enough that the pin 44 can return into the recess of the arm. Simultaneously the spring 43 is set to tension. As soon as this is done, then the contact-surface 49 produces at the next turn of the wheel 41 a shifting of the arm 40 in radial outward direction, so that the pin 44 is returned into the recess of the arm 40, and can therefore hold the same in the position shown in Fig. 6. After the wheel 41, after several step-by-step shifting motions, is returned into the position shown in Fig. 6, the operation commences over again, and the plate 35 is again opened for permitting the passage of the light to the sensitive film and automatically closed again after the exposure is made.

Briefly stated, the operation of the changing of the apparatus can be described as follows: The clockwork brings the sector 35 in mesh with the arm 40, which latter is held in position until the arm 39 of the cover 35 arrives and opens the objective. When the same is entirely opened, the pressing back of the tooth 40 by the spring up to the pin 43 is made. The moment of the exposure produces the opening just in the very instant that the motion of the film-band is arrested. In this manner, notwithstanding the independence of the motion of the band and its variability, and notwithstanding the complexity which takes place as a consequence of the intermitting movement of the band, a photographic exposure at certain intervals of time, during the arresting of the motion of the band, is obtained.

What I claim as my invention and desire to secure by Letters Patent is:

1. An apparatus for automatically recording the course of a ship and other data, comprising a compass, an objective above the same, a sensitive film above the objective, a ship's log floating in the water at the stern of the vessel, driving means for transmitting the rotatory motion of the log to the film for imparting a variable speed to the same, a shutter interposed between the objective and the film, and means for opening and closing the shutter at regular intervals of time for taking successively pictures of the compass-card.

2. An apparatus for automatically recording the course of a ship and other data, comprising a compass, an objective above the same, a sensitive film above the objective, a ship's log floating in the water at the stern of the vessel, driving means for transmitting the rotatory motion of the log to the film for imparting a variable speed to the same, a shutter between the objective and film, means for opening and closing the shutter for taking successively pictures of the compass on the film, and means for developing the pictures on the film.

3. An apparatus for automatically recording the course of a ship and other data, comprising a compass, an objective above the same, a sensitive film, a ship's log submerged at the stern of the vessel, means driven by the log for imparting a variable speed to the film, a shutter interposed between the objective and film and provided with a sector-shaped recess, means for intermittently rotating the shutter at regular intervals of time, a sector-shaped cover on said shutter, and means for actuating the cover for opening or closing the shutter.

4. An apparatus for automatically recording the course of a ship and other data, comprising a compass, an objective above the same, a sensitive film above the objective, means for periodically moving the film over the objective, a shutter interposed between the objective and film, means for opening and closing the shutter at uniform intervals of time, a ship's log at the stern of the vessel, means between the ship's log and the film for imparting a variable speed to the film according to the varying speed of the ship for taking pictures on the film of the compass at variable distances from each other.

5. An apparatus for recording the course of a ship and other data, comprising a compass, an objective above the same, a sensitive film above the objective, means for moving the film over the objective, a shutter interposed between the objective and the film, means for opening and closing the shutter at regular intervals of time, a ship's log at the stern of the vessel, a differential gear driven by the ship's log and interposed between it and the means for moving the film for imparting a variable speed to the same for taking pictures of the compass at variable distances from each other according to the varying speed of the ship.

In testimony, that I claim the foregoing as my invention, I have signed my name in presence of two subscribing witnesses.

JULIAN WLODZIMIRSKI.

Witnesses:
HENRY HASPER,
WOLDEMAR HAUPT.